Patented Mar. 27, 1945

2,372,255

UNITED STATES PATENT OFFICE 2,372,255

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application June 23, 1943, Serial No. 492,181

5 Claims. (Cl. 252—332)

This invention relates primarily to the resolution of petroleum emulsions.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude petroleum and relatively soft waters or weak brines. Controlled emulsification and subsequent demulsification under conditions just mentioned, is of significant value in removing impurities, particularly inorganic salts, from pipeline oil.

The demulsifier or demulsifying agent employed in our present process, in its more important aspect, consists of the sulfonic acid or sulfonic acid salt of an alkylated or alkoxy diaryl alkyl methane, in which at least one of the aryl groups contains at least one hydroxy radical, or at least one alkoxy radical, and there may be present at least one nuclear-linked alkyl radical, with the proviso that there must be at least one occurrence of an alkyl radical of the type previously indicated, and said alkyl radical must contain at least three and not over ten carbon atoms. Additional variants will be indicated subsequently. In numerous instances, and in fact, it is preferred, to use the type derived from reactants in which there are two phenylol groups, and additionally, two alkyl groups directly attached to the methane nucleus, as, for example, diphenylol dimethyl methane. Such latter reactant may be prepared in the following manner: Phenol is reacted with acetone (or diethyl ketone or methyl ethyl ketone) as described in U. S. Patent No. 1,225,748, of Wallace A. Beatty, to give the compound diphenylol dimethyl methane

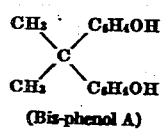

(Bis-phenol A)

or the corresponding diethyl or methyl ethyl compound. Alkyl radicals attached to methane carbon atom may be replaced by alkylene radicals. Furthermore, the non-aryl methane carbon atom substituents may be alicyclic or alkylaryl. The last mentioned raw material represents the type of phenyl-ketone condensation product known generically in the art as "bisphenols," and are readily available and comparatively inexpensive. As to the manufacture of bis-phenols, reference is made to U. S. Patent No. 2,182,308, dated December 5, 1939, to Britton and Bryner. Bis-phenols have the general formula:

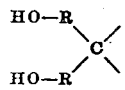

wherein R is an aryl group and the free bonds are linked with alkyl groups or an alkylene radical. They are commonly prepared by reacting a phenol, e. g., phenol, o-cresol, etc., with a ketone such as acetone, methyl ethyl ketone, dibenzyl ketone, cyclohexanone, etc., in the presence of a concentrated strong mineral acid such as sulfuric or hydrochloric acid. Any ketone, e. g., acetone, methyl ethyl ketone, diethyl ketone, dibutyl ketone, cyclohexanone, may be employed in the reaction, and also a variety of phenols can be used; for instance, phenol, o-cresol, o-chlorphenol, etc., are suitable.

Similar reagents are derivable from a variety of other carbonyl-containing compounds, including ketones, in which the carbonyl oxygen is activated by the presence of a halogen as a substituent for a hydrogen atom, alpha-chlorinated aldehydes, etc. In the art relating to this type of compound they are sometimes described as "substituted methanes"; other times as "substituted 2,2 propanes." Although there is extensive literature dealing with this type of compound, reference is made only to a few additional patents, to wit: British Patent No. 274,439, to Chemische Fabrik Auf Actien; to British Patent No. 254,753, and British Patent No. 443,559, to I. G. Farbenindustrie, A. G.

Another suitable type of material is exemplified by p-Cumyl phenol

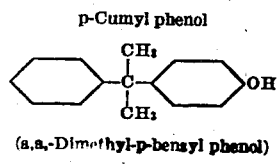

(a,a,-Dimethyl-p-benzyl phenol)

Having obtained a diaryl substituted methane of the type previously described, which contains a nuclear-linked alkyl radical having at least three carbon atoms and not more than 10 carbon atoms, one need only subject such reactant to sulfonation, in order to obtain a compound of the kind herein contemplated for use as such, or after neutralization. For instance, if one obtains a propylated or butylated or amylated bis-phenol A, or the equivalent, in which the propyl, butyl, or amyl group is directly attached to the aromatic nucleus, such compound need only be subjected to sulfonation, followed by the usual steps for elimination of the excess sulfonating agent, such as sulfuric acid, oleum, etc.

If, however, one employs a raw material, in which there is no nuclear substituted alkyl radical, or if it is desirable to introduce an additional nuclear substituted alkyl radical or radicals, then it is preferable to employ a procedure of the kind commonly used in conversion of naphthalene to an alkylated naphthalene sulfonic acid. (For example, see U. S. Patent No. 2,309,935, dated February 2, 1943, to Claytor.) Briefly stated, the process consists in converting the aromatic material, for instance, bis-phenol A in the present instance, into a sulfonic acid. The sulfonic acid so obtained may be a polysulfonic acid, for instance, a di-, tri-, or tetrasulphonic acid, but it is preferably a monosulfonic acid. Generally speaking, there is no advantage in introducing more than one sulfonic acid radical. Furthermore, it is immaterial whether one obtains one isomeric sulfonic acid, or another isomeric sulfonic acid, or a mixture.

The alcohol employed, such as a propyl alcohol, a butyl alcohol, an amyl alcohol, a hexyl alcohol, a decyl alcohol, etc., is converted into the acid sulfate, such as propyl hydrogen sulfate. The aryl sulfonic acid and the alkyl hydrogen sulfate are combined in proportions so that 1, 2, 3, or even 4, alkyl groups are introduced into the aromatic residue. This condensation reaction is generally carried out in the presence of an excess of sulfuric acid. Sulfuric acid may be of any suitable strength, and one preferably employs oleum. In some instances, the various reactions, such as sulfonation, sulfation, condensation, etc. are carried out simultaneously. Generally speaking, the dialkylated and trialkylated materials appear to yield the most desirable type f resultant. The presence of some monoalkylated material, or some tetra-alkylated material is not objectionable, and may even be desirable.

It is obvious, of course, that the alkylated groups introduced might be derived from olefines, such as butylene, propylene, amylene, etc., insofar that such olefines react directly with sulfuric acid to produce the alkyl hydrogen sulfates. Of course, in addition to introducing such alkyl groups of the kind described into the aromatic nucleus or nuclei, one could also introduce an alkyl residue from some other alcohol, as, for example, an alkylated group derived from ethyl or methyl alcohol. Such methyl group might be present in the event that the primary raw material employed happened to be a suitably selected cresol. Regardless of whether or not one introduces such other residues, it is necessary that at least one alkyl residue of the kind described, i. e., having at least 3 carbon atoms and not more than 10 carbon atoms, be introduced into the aromatic nucleus or nuclei.

Such compounds having some other group present, such as a methyl group, might be considered as being derived from a cresol, or ethyl phenol, instead of a phenol, or as being derived from toluene or xylene, or ethyl benzene instead of benzene. In such instances, the resultant is, of course, herein contemplated, in view of what has been said previously, and is an obvious equivalent.

It is immaterial as to the particular alcohol employed, or the particular isomeric form of the alcohol employed, although, generally speaking, it is most desirable to use the one lower or lowest in cost. It is immaterial whether one uses normal propyl alcohol, or isopropyl alcohol. It is immaterial whether one uses a normal butyl alcohol, or isobutyl alcohol. It is immaterial whether the alcohol be a primary alcohol, or a secondary alcohol, or a tertiary alcohol, or the like.

Previous reference has been made to the fact that an alkyl group containing at least 3 carbon atoms and not more than 10 carbon atoms, can be present prior to sulfonation, i. e., that a suitable sulfonic acid is produced by sulfation alone, without an alkylation or condensation step. There is, of course, a definite limit to the selection of alkylated phenols as raw materials for condensation with a ketone or an aldehyde. Basically, the reason relates to the activation of a nuclear hydrogen atom by the hydroxyl group, so that condensation with elimination of the carbonyl oxygen atom will take place. As has been previously pointed out, bis-phenols may be obtained from ortho substituted phenols. Thus, one might use orthobutyl phenol, orthoamyl phenol, etc.

One may, of course, prepare a bis-phenol from unsubstituted phenols, so as to obtain a reactant of the kind exemplified by bis-phenol A. Such product contains no nuclear substituted alkyl radicals containing 3 to 10 carbon atoms. If, however, one subjects such reactant to some conventional reaction so as to introduce an alkyl radical, it may happen, and frequently does happen, that the alkyl radical enters at the phenolic hydroxyl hydrogen atom position, rather than at the nuclear position. Reference is made to reactions such as the Friedel and Crafts reaction, or any manner of a number of similar reactions, in which the alkylating agent is an alkyl halide containing 3 to 10 carbon atoms, such as propyl chloride, butyl chloride, octyl chloride, decyl chloride, etc. The condensation agent or catalyst may be exemplified by aluminum chloride, boron tri-fluoride, zinc chloride, sulfuric acid, or other equally well known reagents. In the briefest aspect, the two types of alkylations thus possible may be indicated as follows:

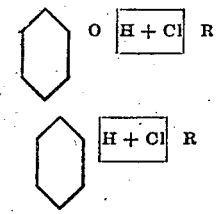

(Only one nuclear hydrogen atom shown.)

If one employs such alkylation reaction, one introduces either an alkyl group, or an alkoxy group. In light of the fact that such reactions are well known, it is not believed that a further description is necessary. Having obtained such suitable reactant by any of the procedures previously described, it is obvious that such reactant can then be subjected to a sulfonation process or procedure in the same manner as employed to sulfonate naphthalene, amyl naphthalene, butylated phenol, or the like. Such sulfonation step may be carried on with a minimum of sulfuric acid, or sulfonating agent, if conducted in the presence of an inert solvent which eliminates the water formed as a result of sulfonation. (See Journal of Industrial and Engineering Chemistry, vol. 35, No. 3, page 326, (1943.)

In any event, as a result of the procedures previously described, one obtains a suitable sulfonic acid containing, at the most, some excess sulfonating agent, and possibly, unchanged reactants. In the actual manufacture of alkylated aryl sulfonic acids, such as those herein contemplated, the sulfonation step is followed by a washing process which removes the excess of sulfuric acid or other sulfonation, sulfation, condensation agents employed. Where a condensation agent, such as aluminum chloride or the like has been employed, it is customary to remove it, of course, prior to the sulfonation step. The sulfonation, mass, briefly stated, is diluted with sufficient water so that the sulfonic acid resulting from sulfonation is insoluble in the more dilute acid. The diluted mass is allowed to stand in a quiescent state until separation takes place. The diluted lower acid also is withdrawn and discarded. The acidic mass thus obtained is neutralized in any convenient manner, with a suitable base, such as caustic soda, caustic potash, ammonium hydroxide, or the like. Certain amines, such as benzylamine, amylamine, cyclohexylamine, octadecylamine, etc., may be employed. The final product, if it represents a pasty, or solid, or semi-solid mass, is rendered useful for industrial use by the addition of a solvent, such as water, or an alcohol, a coal tar solvent, a petroleum hydrocarbon solvent, or by the use of any other suitable solvent, such as a phenolic body, or a chlorinated hydrocarbon.

*Example 1*

1 pound mole of di-phenylol dimethyl methane (bis-phenol A) is mixed with 1 pound mole of propyl hydrogen sulfate. 1 to 2 pound moles of sulfuric acid 96%, or weak oleum are added. The mass is stirred constantly at a temperature varying from 70° C. to 95° C., for approximately 3 to 8 hours, until tests indicate that both sulfonation reaction and condensation reaction are complete. The sulfonated mass is then diluted with water until it shows a tendency to separate readily. It is then permitted to remain in a quiescent state until such separation is complete. The lower layer of dilute acid is withdrawn and the acidic mass neutralized with a base which enhances, or, at least, does not markedly reduce water solubility. Such basic materials include caustic soda, caustic potash, ammonium hydrate, triethanolamine, oxyethylated triethanolamine, derived by treating triethanolamine with ethylene oxide, oxyethylated tris-(hydroxymethyl) aminomethane, derived by treating tris(hydroxymethyl)aminomethane with ethylene oxide, etc.

*Example 2*

The same procedure is followed as in Example 1, preceding, except that 2–4 moles of propyl hydrogen sulfate are employed for each mole of the aryl reactant.

*Example 3*

The same procedure is followed as in Examples 1 and 2, preceding, except that butyl hydrogen sulfate, amyl hydrogen sulfate, hexyl hydrogen sulfate, or octyl hydrogen sulfate, is substituted in place of propyl hydrogen sulfate.

*Example 4*

The same procedure is followed as in Examples 2 and 3, preceding, except that a mixture of at least two different alkyl hydrogen sulfates are employed in each instance. For example, a mixture of propyl hydrogen sulfate and butyl hydrogen sulfate, or butyl hydrogen sulfate and amyl hydrogen sulfate, or propyl hydrogen sulfate and amyl hydrogen sulfate.

*Example 5*

The same procedure is followed as in the preceding examples, except that para-cumyl phenol is used instead of bis-phenol A.

*Example 6*

The same procedure is followed as in Examples 1 to 4, preceding, except that phenyl-phenylolmethyl methane of the following composition:

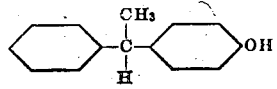

is used to replace bis-phenol A.

*Example 7*

A butylated bis-phenol A, obtained by reacting ortho-monobutyl phenol with acetone in the manner described in the aforementioned Britton and Bryner patent, is subjected to sulfonation, without the addition of an alkylating agent. The sulfonated mass, so obtained, is treated in the same manner as described in Example 1, preceding.

*Example 8*

A bis-phenol obtained from phenol and dibenzyl ketone is used in place of bis-phenol A, used in Examples 1 to 4, preceding.

*Example 9*

A bis-phenol derived from cyclohexanone and phenol is used to replace bis-phenol A in Examples 1 to 4, preceding.

*Example 10*

In the previous examples where a cumyl phenol or a bis-phenol is subjected to condensation with an alkyl hydrogen sulfate, in the presence of sulfuric acid, there is employed instead a conventional Friedel and Crafts reaction, involving one mole of the selected aryl reactant and 1 to 4 moles of an alkyl halide, for instance, propyl chloride, butyl chloride, amyl chloride, hexyl chloride, octyl chloride, decyl chloride, in the presence of aluminum chloride, so as to cause condensation. After completion of the condensation, conducted in the conventional manner, the aluminum chloride is removed by customary procedure, such as by extraction of the organic matter by ether, prior to or after treatment with water, steam distillation, or hydrolysis in presence of added hydrochloric acid, followed by extraction, or distillation, or other equivalent procedure.

The alkylated aryl compound so obtained is subjected to sulfonation in the manner described in respect to the butylated bis-phenol A, previously described, the washing, sulfonation, and neutralizing steps being substantially the same.

Example 11

The same procedure is followed as in Examples 1–10, preceding, except that the acidic mass is employed, as such, or after neutralization with a base which tends to reduce water solubility, and in fact, may result in a compound which is either oil-soluble, or almost water-insoluble, or completely water-insoluble, or may show extreme insolubility in either water or oil. Among the suitable bases for such purposes are: pyridine cyclohexylamine, dicyclohexylamine, benzylamine, dibenzylamine, amylamine, diamylamine, triamylamine, octadecylamine, and particularly high molal amines, which, in the form of the acetate, show surface activity.

Example 12

The same procedure is followed as in Examples 1 to 10, preceding, except that the final product is converted into the salt of a quaternary ammonium base. The particular ammonium bases employed are characterized by the type in which salts having a low molal anion are surface-active, i. e., quaternary bases of the kind that the chloride, nitrate, bromide, acetate, lactate, and the like, show surface-activity in aqueous solution. Generally speaking such quaternary compounds are more apt to be available in the form of salts, for instance, a chloride or bromide, rather than in the form of the free base. In light of this fact, salts of the kind herein contemplated, i. e., sulfonates, are best obtained metathetically. The two conventional procedures for such metathetical reactions involve preparing the sodium potassium, the ammonium salt of the sulfonic acids previously described, and then reacting an alcoholic solution of such salts with an alcohol solution of the quaternary chloride or bromide. Another procedure involves the principle that the combination of a surface-active anion and surface-active cation is apt to produce a salt which is insoluble in water, in absence of an excess of either reactant. Thus, an aqueous solution of the sodium, potassium, or ammonium salt of the kind described in Examples 1 to 10, preceding, may be reacted in dilute solution, for instance, 5%, with a 5% solution of cetyl pyridinium bromide, or any one of a number of other surface-active quaternary halides, as, for example, those described in our co-pending application Serial No. 463,439, filed October 26, 1942.

Attention is directed to another variation or sub-genus which is particularly valuable. Such sub-genus or subdivision is obtained by oxyethylation of the aryl compound. Oxyethylation is conducted by means of compounds having a reactive ethylene oxide ring, such as, for example, ethylene oxide, propylene oxide, butylene oxide, etc. If such oxyethylation is conducted prior to a Friedel & Crafts reaction, it is obvious that the alkyl group introduced is attached to the nuclear carbon atom by an oxyethylene radical or a polyoxyethylene radical. Similarly, the hydroxyl group, after oxyethylation, represents a similar situation in which the hydrogen oxygen bond is interrupted by an oxyalkylene radical, or a polyoxyalkylene radical. In any event, the number of oxyalkylene radicals introduced is limited so that water solubility is not obtained in absence of a sulfonic group. Generally speaking, this means that the polyoxyalkylene radical appearing between a nuclear carbon atom and a hydrogen atom, or between a nuclear carbon atom and an alkyl radical, will contain not over 10 ether linkages. This relationship is indicated in the following manner, the arrow indicating oxyalkylation, and more particularly, oxyethylation:

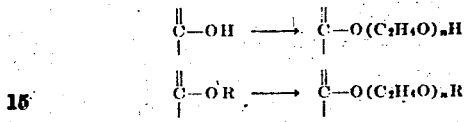

in which $n$ is the numeral 9 or less. The second type is obtained most advantageously by replacing the terminal hydrogen in the first type by an alkyl condensation reaction, such as a Friedel & Crafts reaction, or some of the others previously referred to. (See our co-pending application. Serial No. 478,597, filed March 9, 1943.)

Summarizing what has been said, the type of compound herein contemplated may be exemplified by the following formula:

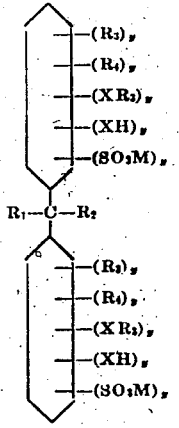

in which $R_1$ is a member of the class selected from alkyl, alicyclic and alkylaryl radicals; $R_2$ is a member selected from the class consisting of alkyl, alicyclic and alkylaryl radicals and hydrogen atoms; $R_3$ is an alkyl radical containing at least 3 and not over 10 carbon atoms; $R_4$ is an alkyl radical containing not over 2 carbon atoms; M is a cation including hydrogen; X is a member of the class consisting of oxygen atoms; oxyalkylene radicals in which the alkylene radical does not contain more than 4 carbon atoms, and polyoxyalkylene radicals in which the alkylene radical does not contain more than 4 carbon atoms and the ether linkage does not appear more than 10 times; and $y$ is a small whole number including zero, with the proviso that there must be at least one occurrence of $R_3$, at least one occurrence of X and at least one occurrence of $SO_3M$.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned, but we have found that such a demulsifying agent has commercial value, as it will economically break or resolve oil field emulsions in a number of cases which cannot be treated as easily or at so low a cost with the demulsifying agents heretofore available.

In practising our process for resolving petroleum emulsions of the water-in-oil type, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to the emergence of said well fluids. This particular type of application is decidedly feasible when the demulsifier is used in connection with acidification of calcareous oil-bearing strata, especially if suspended in or dissolved in the acid employed for acidification.

The chemical products or compounds herein described constitute the subject-matter of our divisional application Serial No. 530,043, filed Apr. 7, 1944.

Having thus described our invention, what we claim as new and desire to secure by Letters Patent is:

1. A process for breaking petroleum emulsions of the water-in-oil type, which consists in subjecting the emulsion to the action of a demulsifier comprising a diaryl substituted methane sulfonate, in which the aryl radicals are monocyclic and the sulfonic acid radical is nuclearly linked, and of the formula:

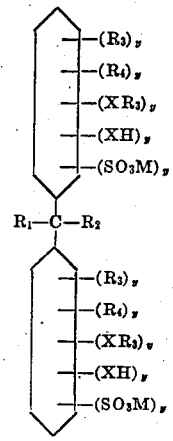

in which $R_1$ is selected from the class consisting of alkyl, alicyclic and alkylaryl radicals; $R_2$ is a member selected from the class consisting of alkyl, alicyclic and alkylaryl radicals and hydrogen atoms; $R_3$ is an alkyl radical containing at least 3 and not over 10 carbon atoms; $R_4$ is an alkyl radical containing not over 2 carbon atoms; M is a cation including hydrogen; X is a member of the class consisting of oxygen atoms, oxyalkylene radicals in which the alkylene radical does not contain more than 4 carbon atoms, and polyoxyalkylene radicals in which the alkylene radical does not contain more than 4 carbon atoms and the ether linkage does not appear more than 10 times; and $y$ is a small whole number including zero, with the proviso that there must be at least one occurrence of $R_3$, at least one occurrence of X and at least one occurrence of $SO_3M$.

2. A process for breaking petroleum emulsions of the water-in-oil type, which consists in subjecting the emulsion to the action of a demulsifier comprising a diaryl substituted monosulfonate, in which the aryl radicals are monocyclic and the sulfonic acid radical is nuclearly linked, and of the formula:

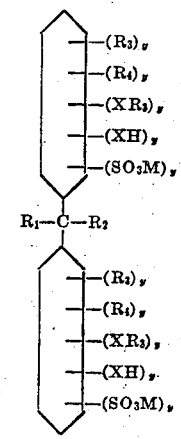

in which $R_1$ is selected from the class consisting of alkyl, alicyclic and alkylaryl radicals; $R_2$ is a member selected from the class consisting of alkyl, alicyclic and alkylaryl radicals and hydrogen atoms; $R_3$ is an alkyl radical containing at least 3 and not over 10 carbon atoms; $R_4$ is an alkyl radical containing not over 2 carbon atoms; M is a cation including hydrogen; X is a member of the class consisting of oxygen atoms, oxyalkylene radicals in which the alkylene radical does not contain more than 4 carbon atoms, and polyoxyalkylene radicals in which the alkylene radical does not contain more than 4 carbon atoms and the ether linkage does not appear more than 10 times; and $y$ is a small whole number including zero, with the proviso that there must be at least one occurrence of $R_3$ and at least one occurrence of X.

3. A process for breaking petroleum emulsions of the water-in-oil type, which consists in subjecting the emulsion to the action of a demulsifier comprising a diaryl substituted methane monosulfonate, in which the aryl radicals are monocyclic and the sulfonic acid radical is nuclearly linked, and of the formula:

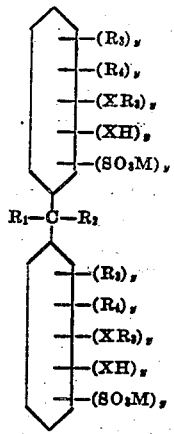

in which $R_1$ and $R_2$ are methyl radicals; $R_3$ is an alkyl radical containing at least 3 and not over 10 carbon atoms; $R_4$ is an alkyl radical containing not over 2 carbon atoms; M is a cation including hydrogen; X is a member of the class consisting of oxygen atoms, oxyalkylene radicals in which the alkylene radical does not contain more than 4 carbon atoms, and polyoxyalkylene radicals in which the alkylene radical does not contain more than 4 carbon atoms and the ether linkage does not appear more than 10 times; and $y$ is a small whole number including zero, with the proviso that there must be at least one occurrence of $R_3$ and at least one occurrence of X.

4. A process for breaking petroleum emulsions of the water-in-oil type, which consists in subjecting the emulsion to the action of a demulsifier comprising a diaryl substituted methane monosulfonate, in which the aryl radicals are monocyclic and the sulfonic acid radical is nuclearly linked, and of the formula:

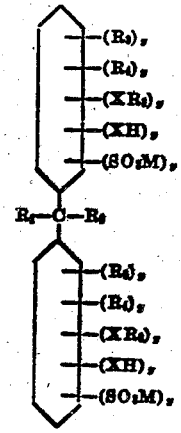

alkyl radical containing at least 3 and not over 10 carbon atoms; $R_4$ is an alkyl radical containing not over 2 carbon atoms; M is a cation including hydrogen; X is a member of the class consisting of oxygen atoms, oxyalkylene radicals in which the alkylene radical does not contain more than 4 carbon atoms, and polyoxyalkylene radicals in which the alkylene radical does not contain more than 4 carbon atoms and the ether linkage does not appear more than 10 times; and $y$ is a small whole number including zero, with the proviso that there must be at least one occurrence of $R_3$ and at least one occurrence of X.

5. A process for breaking petroleum emulsions of the water-in-oil type, which consists in subjecting the emulsion to the action of a demulsifier comprising a diaryl substituted methane monosulfonate, in which the aryl radicals are monocyclic and the sulfonic acid radical in nuclearly linked, and of the formula:

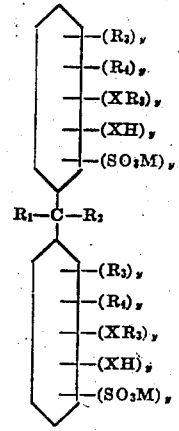

in which $R_1$ is a methyl radical and $R_2$ is an ethyl radical; $R_3$ is an alkyl radical containing at least 3 and not over 10 carbon atoms; $R_4$ is an alkyl radical containing not over 2 carbon atoms; M is a cation including hydrogen; X is a member of the class consisting of oxygen atoms, oxyalkylene radicals in which the alkylene radical does not contain more than 4 carbon atoms, and polyoxyalkylene radicals in which the alkylene radical does not contain more than 4 carbon atoms and the ether linkage does not appear more than 10 times; and $y$ is a small whole number including zero, with the proviso that there must be at least one occurrence of $R_3$ and at least one occurrence of X.

MELVIN DE GROOTE.
BERNHARD KEISER.